United States Patent [19]
Austin et al.

[11] 4,082,413
[45] Apr. 4, 1978

[54] SELECTIVE RADIATION ABSORPTION DEVICES FOR PRODUCING HEAT ENERGY

[75] Inventors: Robert R. Austin, Wilton; Roy C. Bastien, Redding, both of Conn.

[73] Assignee: The Perkin-Elmer Corporation, Norwalk, Conn.

[21] Appl. No.: 646,368

[22] Filed: Jan. 2, 1976

Related U.S. Application Data

[63] Continuation-in-part of Ser. No. 528,309, Nov. 29, 1974, abandoned.

[51] Int. Cl.² .................................................. G02B 5/20
[52] U.S. Cl. .................................. 350/1.1; 126/270; 350/166; 350/290; 350/1.7
[58] Field of Search ................. 350/1, 290, 166; 126/270, 1

[56] References Cited

U.S. PATENT DOCUMENTS

| | | | |
|---|---|---|---|
| 2,808,351 | 10/1957 | Colbert et al. | 350/166 |
| 3,591,248 | 7/1971 | Meunier et al. | 350/166 |
| 3,619,235 | 11/1971 | Furuuchi et al. | 350/1 |
| 3,660,137 | 5/1972 | Furuuchi et al. | 350/1 |

OTHER PUBLICATIONS

H. E. Van Winkle, One-Way Radiant Heat Transfer, IBM Technical Disclosure Bulletin, vol. 18. No. 14, Sep. 1975, p. 1003.

*Primary Examiner*—John K. Corbin
*Assistant Examiner*—B. W. delos Reyes
*Attorney, Agent, or Firm*—S. A. Giarratana; F. L. Masselle; J. D. Crane

[57] ABSTRACT

A device for absorption of selected radiation wavelengths, such as solar radiation, for producing heat energy, consists essentially of a single film or layer of a mixture of metal particles and a dielectric material which are coated on a supporting substrate of either metal or glass. The metal and dielectric concentration varies in a gradual transition from a major portion, up to 100%, of metal at one boundary surface to a major portion, up to 100%, of dielectric at the opposite boundary surface. There are no interior boundaries in the film; the film composition is inhomogeneous between the boundary surfaces and substantially homogeneous in planes generally parallel to the boundary surfaces. Dielectric materials and metals are disclosed in combinations adapted for solar radiation absorption over a broad band of wavelengths, on the order of from 0.35 to 1.5 micrometers, while reflecting the longer wavelengths, and adapted to provide good mechanical and radiation stability at high temperatures, up to temperatures on the order of 450° C, in air or in a vacuum. Heat building up in the film as radiation is absorbed is withdrawn for use or storage by heat transfer means such as a heat transfer fluid flowing through a conduit in thermal contact with the film or with the substrate on which the film is deposited.

8 Claims, 2 Drawing Figures

SELECTIVE RADIATION ABSORPTION DEVICES FOR PRODUCING HEAT ENERGY

BACKGROUND OF THE INVENTION

This is a continuation-in-part of corresponding U.S. patent application Ser. No. 528,309, filed Nov. 29, 1974 now abandoned.

The present invention is a device for selectively absorbing radiation for producing heat. In particular, the invention is a selective absorber for absorbing of a broad band of radiation, or a selected band of radiation such as solar radiation, which is thereby converted to heat energy. The device is particularly adapted to provide good mechanical and radiation stability under rugged conditions, in air or a vacuum as in a space vehicle in which the environment may reach temperatures up to 450° C.

Known selective absorbers that have been used for absorbing solar radiation, for solar furnaces or solar energy "farms" for example, fall into three general types, solid state type devices, microporous surface devices and multilayer interference devices.

The solid state type consists of a dielectric or semiconductor film, such as a germanium or silicon film, over a highly reflective metal surface, such as gold or silver. The dielectric or semiconductor is absorbing at invisible wavelengths, but transmits infrared radiation out to wavelengths at which it is desired to maintain high reflectivity and low emissivity.

The microporous surface device consists of fine pores, pits, grooves, lines or checks in the surface of a low emittance material, such as copper. The dimensions of the surface roughening is made small compared with the wavelength of the emitted energy, and thus increases the surface area that is seen by the shorter wavelengths, thus enhancing the absorption at these wavelengths without significantly increasing the emissivity at the longer wavelengths.

The third general type, the multilayer interference type absorber, is perhaps the one of most interest for solar radiation absorption to date; it consists of superposed layers of dielectric and semi-transparent metallic films on a reflective metal substrate. The wavelength response of the multilayer devices at visible wavelengths is similar to the response of multilayer antireflecting coatings on glass substrates. These devices are potentially useful for providing high absorption values at solar radiation wavelengths and controlled transition between the high absorption and high reflectivity regions. Their attractiveness is somewhat limited, however, by the difficulty of manufacturing them, particularly in the devices wherein many layers are used to provide a useful absorption range and controlled transition, and additionally they are not particularly suited for use in rugged environments, or where they must be relied on for a long service life, as in space, due to the mechanical instability of the layer construction when subjected to any appreciable stress.

BRIEF DESCRIPTION OF THE INVENTION

A principal object of the present invention is to provide a selective absorber having a high ratio of absorption to emissivity over a broad band of wavelengths, such as wavelengths including the range of wavelengths in the solar radiation range.

Another object of the invention is to provide a selective radiation absorber which will maintain its spectral properties over a wide range of angles of incidence of the radiation impinging on its surface.

A further object is to provide such an absorber whose construction adapts it for maintaining its mechanical and radiation stability in rugged environments, including high temperatures on the order of 450° C in a vacuum or in air.

Another object is to provide such a radiation absorber which is relatively simple and economical to manufacture in various modifications having specifically desired spectral and physical characteristics.

The foregoing and further objects are achieved by the selective radiation absorber of the present invention which consists essentially of a film or layer formed of particles of metal in a transparent dielectric material with the relative concentration of the metal particles and dielectric material in a gradual transition from a major portion, up to 100%, metal at one boundary, to a major portion, up to 100% dielectric at the opposite boundary, there being no intermediate boundaries. The device is suitably formed by simultaneously depositing metal and dielectric on a substrate by vapor deposition or thermal evaporation, for example, and by varying the ratio of metal to dielectric as the composition builds up on the substrate.

In the context of the present invention as described herein, "transparent" as applied to the dielectric material means that the dielectric material is transparent at least to radiation over the spectral range at which the device is intended to operate whereas the metal absorbs and reflects radiation. The dielectric material may incidentally be one which has some absorbancy itself, but this is not necessary, or particularly useful. The only real limitations on the metals and dielectric materials which may suitably be used in the invention are possible practical limitations as to economical techniques for forming particular metals and dielectric materials into a film or layer which has the mechanical and/or chemical stability to stand up to the degree or stress or chemical action that it will be subjected to in a particular environment in which the device is intended to be used.

For providing the spectral response desired, the requisites are that the film or layer constituting the device be substantially reflective at one boundary, by having the major portion of the composition at that boundary metal, and by having a gradual transition, without intermediate boundaries, from reflectivity to transmissivity (transparency) through the thickness of the layer to the opposite boundary at which radiation enters the device, there being no intermediate boundary layers.

Heat builds up in the film or layer as radiation is absorbed and this heat is suitably withdrawn for use or storage by suitable heat transfer means such as a heat transfer fluid, eg. water, flowed through a conduit that is adjacent the film or layer so as to be substantially in thermal contact therewith.

In comparison with multi-layer absorption devices, consisting of alternate layers of transparent dielectric material and semi-transparent metal films on a reflective substrate, the device of the present invention is adapted to provide a wider spectral range of absorption as well as being considerably simpler and more economical to manufacture. Additionally, since the device of the present invention is not an interference device, as in the multi-layer absorption device its efficiency of operation over its spectral range of operation is not limited to a narrow range of angles of incidence of the entering radiation.

DESCRIPTION OF THE DRAWINGS

The invention is described in detail below with reference to the accompanying drawings in which.

DETAILED DESCRIPTION

Figure 1:
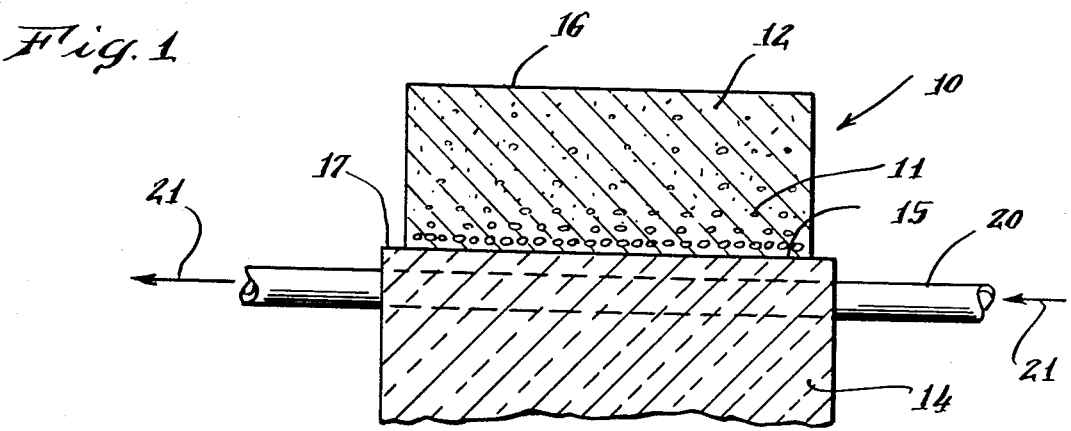
FIG. 1 is a cross-sectional view of a radiation selective absorbing film or layer in accordance with the invention and showing it mounted on a support substrate.

A selective absorption device embodying the present invention consists essentially of a film or layer 10 which is a mixture of particles 11 of metal and a dielectric material 12 that is transparent at least to radiation over the spectral range at which the absorption device is intended to operate. The film 10 may be mounted on a support substrate 14 which is of any suitable material such as glass or metal.

As heat builds up in the film or layer 10 due to the absorption of radiation it is continually withdrawn and carried to another location for use or storage. This may be accomplished by any suitable heat transfer means such as water or other heat transfer fluid flowing through a conduit adjacent the film. FIG. 1 illustrates a heat transfer system consisting of a conduit 20 embedded in the substrate 14 for a heat transfer fluid such as water to flow through as indicated by the arrows 21.

As indicated in FIG. 1 the concentration of metal particles 11 and dielectric material 12 varies through the thickness of the film 10 from being a major portion, up to 100%, metal at one boundary 15 (which is the bottom boundary in the drawing) to a major portion, up to 100%, dielectric material at the opposite boundary 16. The transition from the portion of highest metal concentration at one boundary (15) to the portion of highest metal dielectric concentration at the other (boundary 16) is gradual through the thickness of the film 10, and is suitably provided by controlled deposition of sequentially varying proportions of metal particles and dielectric material on a substrate 14 as the film builds up. Suitable processes for thus depositing metal particles and dielectric material include vapor deposition and thermal evaporation. The method of depositing or forming the film is, however, not critical to the invention defined herein.

For suitable operation of the absorption device of this invention the transition from a major portion of metal at one boundary to a major portion of dielectric material at the opposite boundary is gradual and is preferably such that the slope of the concentration profile through the thickness of the film 10 is as uniform as possible from point to point therealong. In practice, however, considerable variations in the rate of change of the relative concentrations of the metals to dielectric at successive points through the film has a negligible effect on the spectral response of the device and can thus normally be tolerated. It may, however, be found desirable (for varying the spectral response within the operating range of the device, for example) to have the relative concentrations vary from a substantially linear rate of change by some predetermined mathematical function, such as logarithmic.

It will be appreciated from the above that the film 10 has no interior boundaries, so that there are no interior interference effects, and that the film 10 is inhomogenous through its thickness between boundaries 15 and 16 while being substantially homogeneous in plane generally parallel to the boundaries.

The thickness of the film 10 between boundaries 15 and 16 determines its wavelengh range of spectral response and its thickness must of course equal at least one-half the longest wavelength in the band of radiation it is desired to have absorbed.

For the operation of the device it is only necessary that the boundary opposite the boundary at which radiation is admitted reflect the radiation impinging on it, and that the transition from the highest concentration of metal at the reflective boundary to the highest concentration of dielectric material at the opposite (ie. entrance) boundary be gradual, and preferably substantially uniform. The reflectivity at the one boundary may be provided by having a 100% concentration of the metal at that boundary, or by having the concentration of metal at that boundary somewhat less than 100% and having an adjacent surface 17 of the substrate 14 suitably reflective. The substrate 14 or its surface need not be reflective if complete reflection is provided by the concentration of metal at the boundary 15 of the film 10. If the reflective boundary is the boundary surface of the film itself, any substrate provided would be for support, and could, therefore, be made of any suitable material.

In an alternative embodiment a substrate of material, such as glass, whose transparency coincides with the transparency of the dielectric material has the film 10 coated thereon by first depositing the highest concentration of metal at the last portion to be deposited, which thus provides the reflective boundary. In this embodiment the entering radiation enters through the transparent substrate 14, and passes through the film 10 to the reflective boundary.

As previously mentioned, the particular metal and dielectric materials are used are not critical, the choice being determined principally by the mechanical and chemical stability required, ease of manufacture and cost of materials. Material suitable for absorbers to be used, for example, in space in a rugged environment in air or a vacuum, where it then might be subjected to severe shock, stress and vibration, and to temperatures ranging up to 450° C, suitable metals would be, but would not be limited to, chromium, molybenum, nickel, tantalum and titanium; suitable dielectric materials would include, but not be limited to cerous fluoride, magnesium fluoride, magnesium oxide, neodymium oxide and yttrium oxide in any combination.

For a solar absorber using a relatively thin film, eg. on the order of 1 micrometer thick, in order to enhance as much as possible the effective absorbancy, it is desirable to use a metal with strong visible absorption properties, such as titanium, but these metals generally have relatively low reflectivities at near infrared wavelengths. It is, therefore, desirable to use such a metal for the metal particles dispersed in the film 10, but to have a metal, such as gold or aluminum, that has good reflectivity in the infrared range, for the reflecting layer at the boundary 15. This infrared reflecting layer at the boundary 15 may be provided by having the film itself contain a 100% of the metal at the boundary 15, or by coating the film, on a substrate surface 17 which is coated with, or otherwise consists of a reflective surface of an infrared reflecting material.

Figure 2:
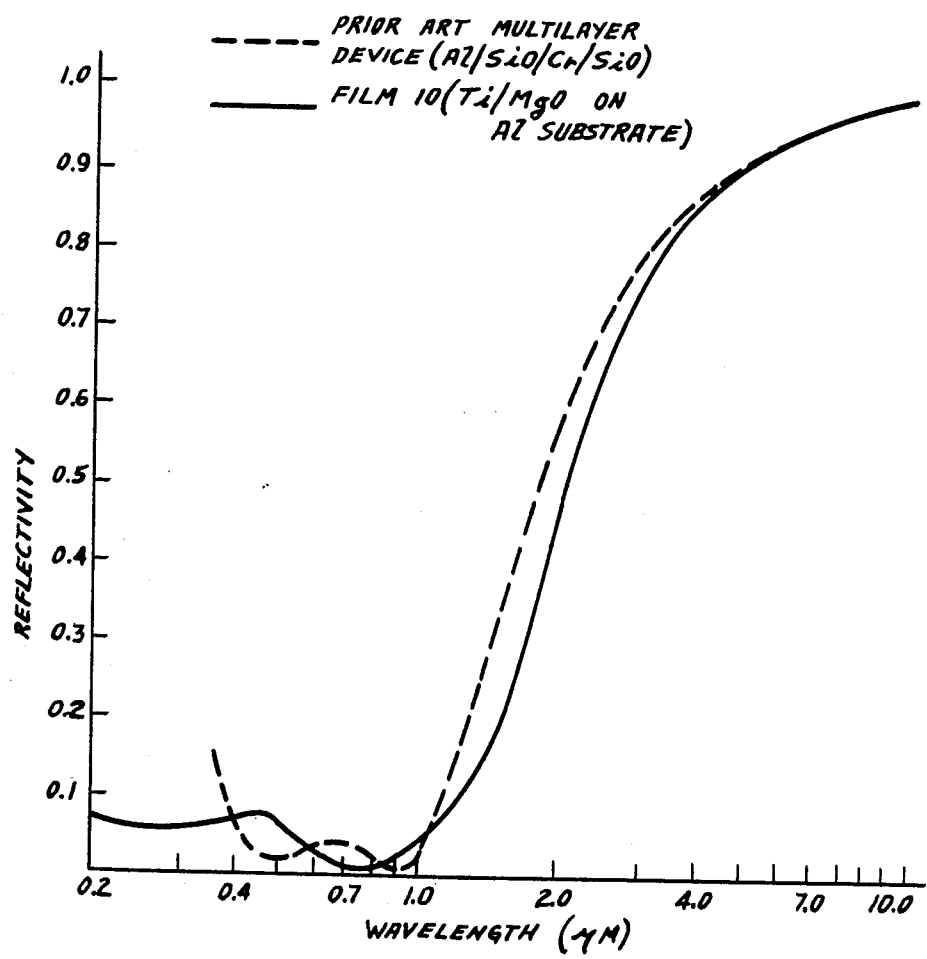
FIG. 2, is a graph showing a plot of reflectivity over a range of wavelengths for a film or layer of the present invention and for a usual form of prior art multi-layer interference type selective absorber.

FIG. 2 is a graph illustrating the reflectivity at various wavelengths from 0.2 to 10 micrometers of a film 10 of this invention consisting of a mixture of titanium and magnesium oxide deposited on aluminum substrate in comparison with the reflectivity over the same wavelengths of a prior art multi-layer interference type device consisting of alternate layers of aluminum, silicon monoxide, chromium, and silicon monoxide respectively, forming a four layer device. As seen in FIG. 2 in the spectral region from 0.4 to 1.1 micrometers there is only a slight difference in the average reflectivity value, and hence the average absorbance value for the two films. It can also be seen that there is very little difference in the two curves at the longer wavelengths, the reflectivity values being almost identical at wavelengths beyond 5.0 micrometers. However, at wavelengths shorter than about 0.4 microns the reflectivity of the prior art multi-layer film device increases sharply whereas the reflectivity of the film 10 stays approximately the same. By increasing the thickness of the film 10, the sharp upturn in the reflectivity curve shown in FIG. 2 would be moved out to longer wavelength regions, ie. to the right in FIG. 2, whereas the spectral range of the prior art multi-layer device, which is an interference device, cannot be so broadened. When the spectral response of the film 10 is increased at the longer wavelength end of the range by increasing the film thickness the short end of the range remains fixed so that the total range is thereby increased in proportion as the film is made thicker.

What is claimed is:

1. A device for producing heat energy by absorption of selected radiation wavelengths having a maximum wavelength in the range of from 0.35 to 1.5 micrometers comprising a single film having boundaries at opposite sides in its thickness direction but not intermediate thereof and composed essentially of a mixture of particles of metal and a transparent dielectric material, the relative concentrations of metal and dielectric varying in transition from a major amount of metal at one of said boundaries to a major amount of dielectric at the opposite boundary, said one boundary being bounded by material which is substantially reflective of said selected radiation wavelengths, the mixture being inhomogeneous through the film between said boundaries and substantially homogeneous at any given distance from one boundary in the film with the film being a thickness at least equal to one half the longest wavelength of said selected wavelengths, and heat transfer means adjacent said one boundary for carrying heat away from the film.

2. The device of claim 1 in which the transition of said relative concentrations varies a substantially uniform amount from point to point progressively through the film from said one boundary to the other.

3. The device of claim 1 in which the concentration of metal and dielectric varies in a transition from substantially 100% metal at one of said boundaries to substantially 100% dielectric at the opposite boundary.

4. The device of claim 1 in which the metal is from the group consisting of chromium, molybdenium, nickel, tantalum and titanium and the dielectric material is from the group consisting of cerous fluoride, magnesium fluoride, magnesium oxide, neodymium oxide, and yttrium oxide.

5. The device of claim 1 in which said film is coated on a substrate.

6. The device of claim 5 in which the boundary of the film at which the concentration of metal particles is highest is against a surface of said substrate, the latter surface being a metallic reflective surface.

7. The device of claim 6 in which the metal particles in the film are primarily absorptive of visible wavelengths and in which said surface of the substrate is a reflective surface of a material that is substantially reflective in the range of infra-red wavelengths.

8. The device of claim 5 in which said substrate has the same transparency as said transparent dielectric material and in which said film is coated on the substrate with the boundary of the film that has the highest concentration of dielectric material being at the substrate.

* * * * *